Sheet 3, 6 Sheets.

C. F. Fisher.

Propeller.

Nº 8,407. Patented Oct. 7, 1851.

Sheet 4, 6 Sheets.

C. F. Fisher.

Propeller.

Nº 8,407.            Patented Oct. 7, 1851.

UNITED STATES PATENT OFFICE.

CHARLES F. FISHER, OF NEW ORLEANS, LOUISIANA.

IMPROVEMENT IN ENDLESS-CHAIN PROPELLERS.

Specification forming part of Letters Patent No. 8,407, dated October 7, 1851.

*To all whom it may concern:*

Be it known that I, CHARLES FREDERICK FISHER, of New Orleans, in the parish of Orleans and State of Louisiana, have invented Improvements in Chain Propellers, of which the following is a specification.

The invention of this horizontal operating submarine propeller, which is to be situated at the bottom of the vessel, near the keel, is not an accidental one, but the result of long reflection and great sacrifice of time and means by me till I succeeded to overcome all the difficulties, which by experimenting have made their appearance, to make it in all respects as perfect as possible; but I now believe that my invention has great advantages over paddle-wheels and all other propellers in use up to the present time, and I am sure that by the dimensions of the plan represented on Plate No. I, with steam-engines of six-feet stroke and the proper force employed and making twenty revolutions per minute, a vessel corresponding in size with the propellers employed can run twenty miles per hour; but if the calculation should be made on greater swiftness by building new vessels it is not out of possibility that even twenty-five to thirty miles per hour might be attained with these propellers, and a vessel of six thousand tons burden by proper construction can with facility make the same progress as a vessel of one hundred tons burden when the number of propellers attached to the vessel are in accordance to its size to give the required force. In cases where more than two propellers are employed—namely, three, four, or six, &c.—to make them operate equally on the shafts, which are in connection with the steam-engines, there are driving-wheels attached to them, surrounded by an endless chain to preserve equal motion by the steam-engines. The rough sea cannot have other effect on the propellers as smooth water, therefore they will operate with the same effect, and great change by the progress of a vessel cannot be occasioned. There is no difficulty to back a vessel by these propellers and they can at all times be examined and easily be repaired, if necessary, as a supply of the different requisite parts belonging to the propellers are always to be kept on hand. Should a vessel run under canvas without steam, the propellers can then be raised above the bottom, inside of the vessel, and the hole in the bottom through which the paddles of the propeller have been descended for operation can be shut up by a sliding lid of iron, so that the bottom of the vessel is then all even, which for cruisers, and war steamers in particular, will be of great importance. The steam-engines for operation can be situated at any place suitable, according to the destination of the vessel, and undoubtedly there will be great saving of fuel.

By the very great advantages, which are striking, by the theory of this submarine propeller, and which are resting on natural grounds, there will be no less durability by them as by others, and in some respects more, and by close examination of practical and scientific men it will be comprehended that by the manner by which the propellers are attached to the vessel many dangers and accidents at sea can be avoided.

The represented plan on Plate No. I, destined for the sea navigation, diminished in size, will undoubtedly be practicable for canal navigation, as there no great commotion of the water can be produced at the bottom of the boat. On Plate No. II is the plan of the same principle altered for the navigation on shallow water, and plate No. III contains some of the principal parts singly illustrated:

*Description of the three accompanying plates.*

Plate No. I contains the plan of the horizontal operating submarine propeller for sea navigation.

Figures 1, 4, 5:
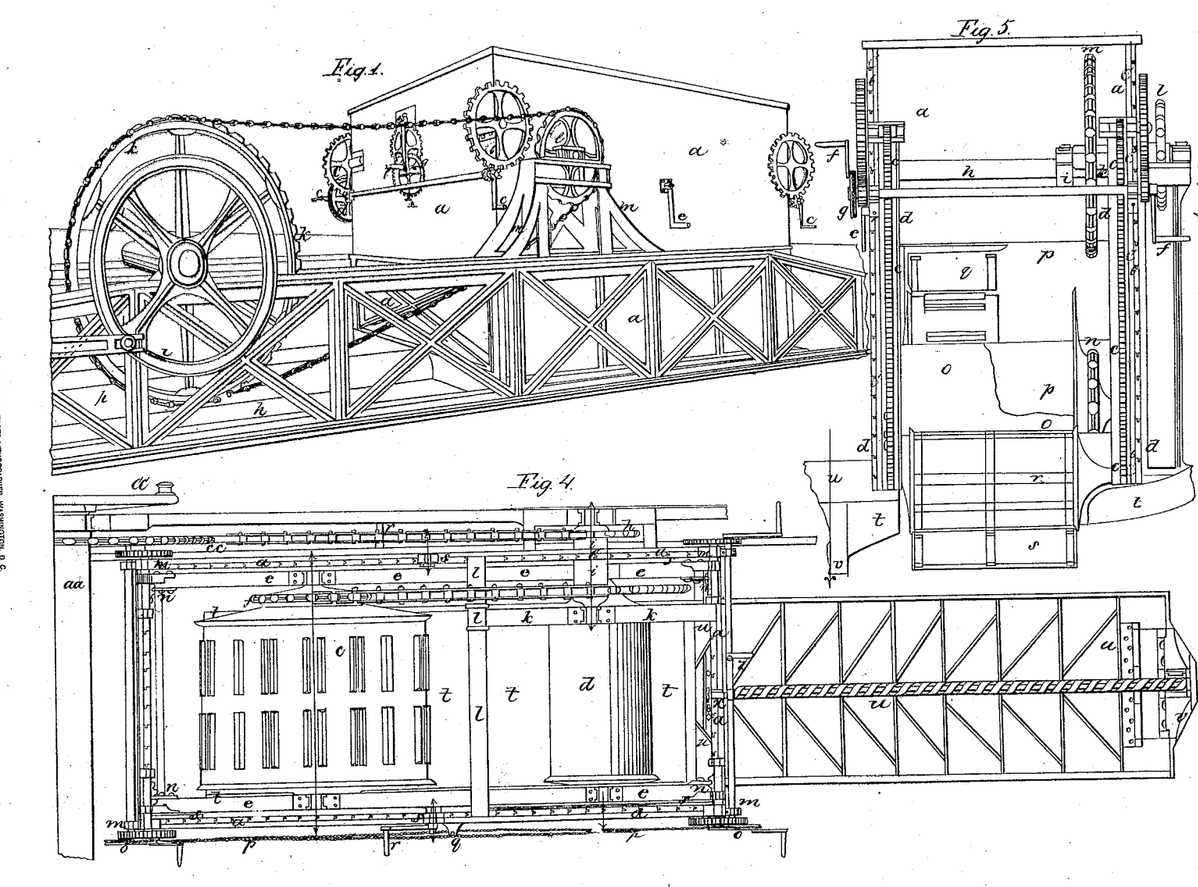
Figure 2:
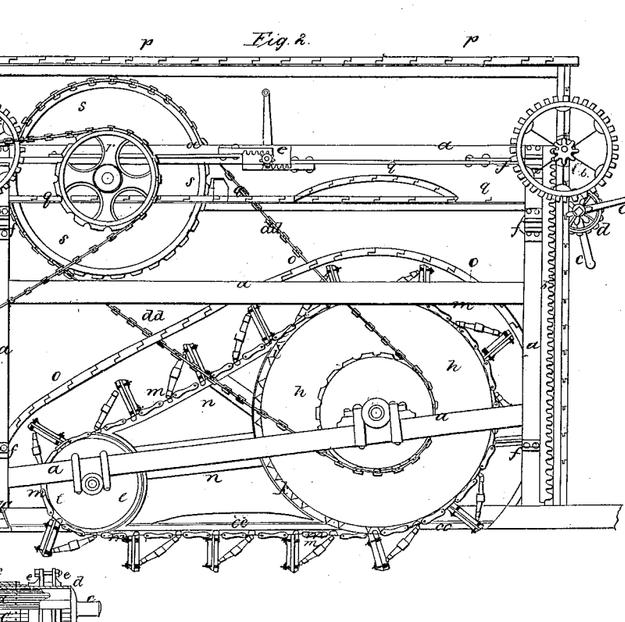
Figure 3:
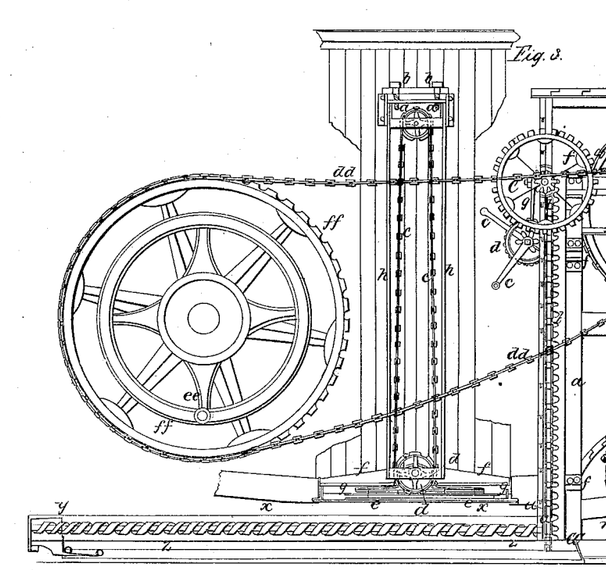
Figure 6:
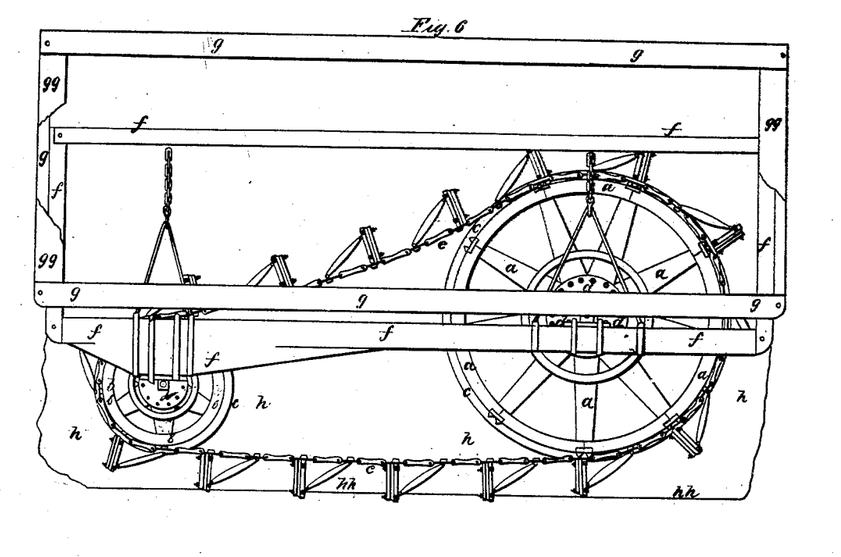
Figure 7:
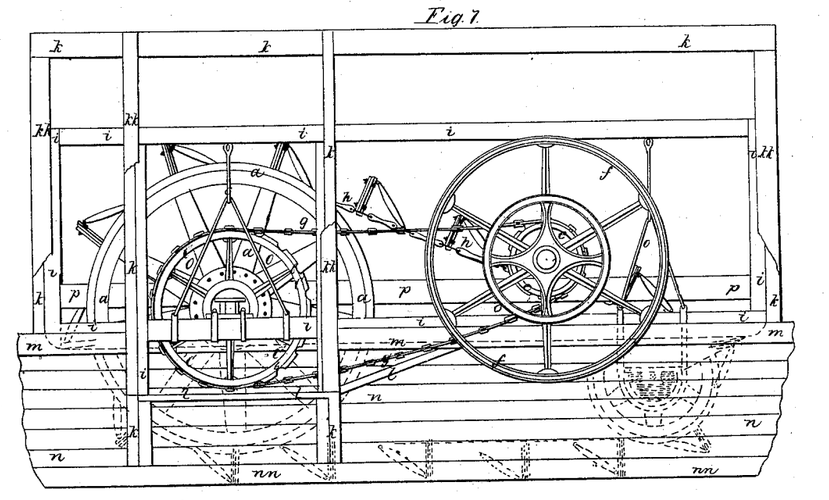
Figure 8:
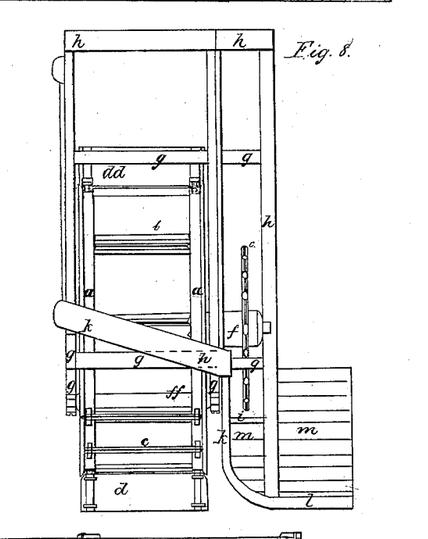
Figure 9:
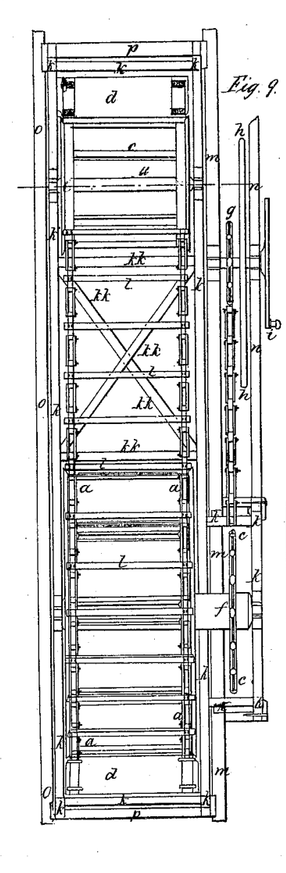
Figure 10:
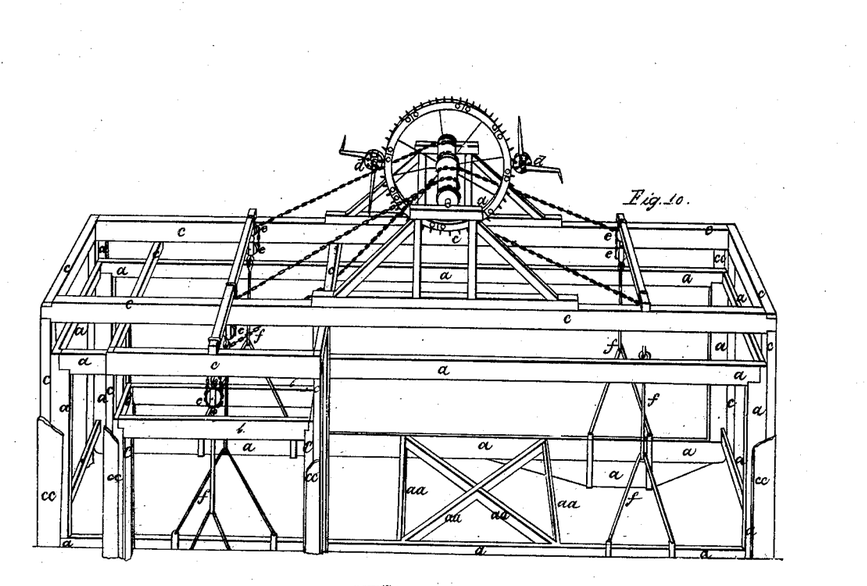
Figure 11:
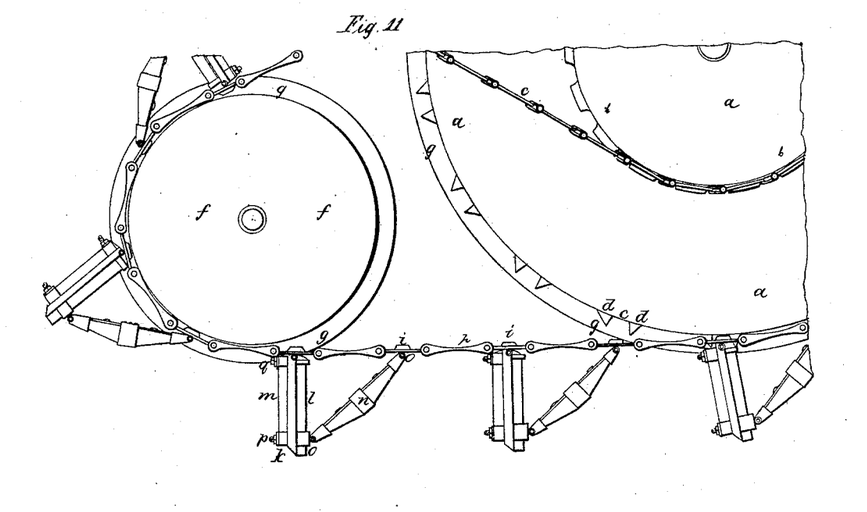
Figure 12:
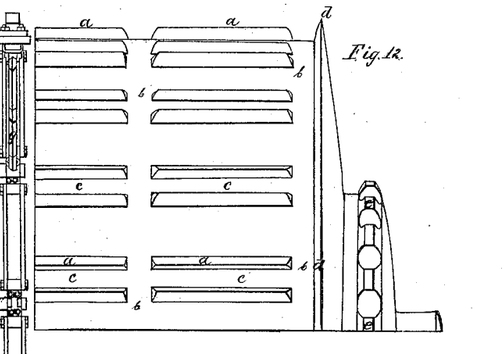
Figure 13:
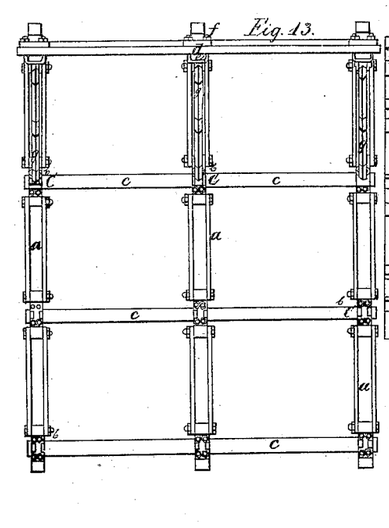
Figures 14, 15, 16, 18, 19, 20:
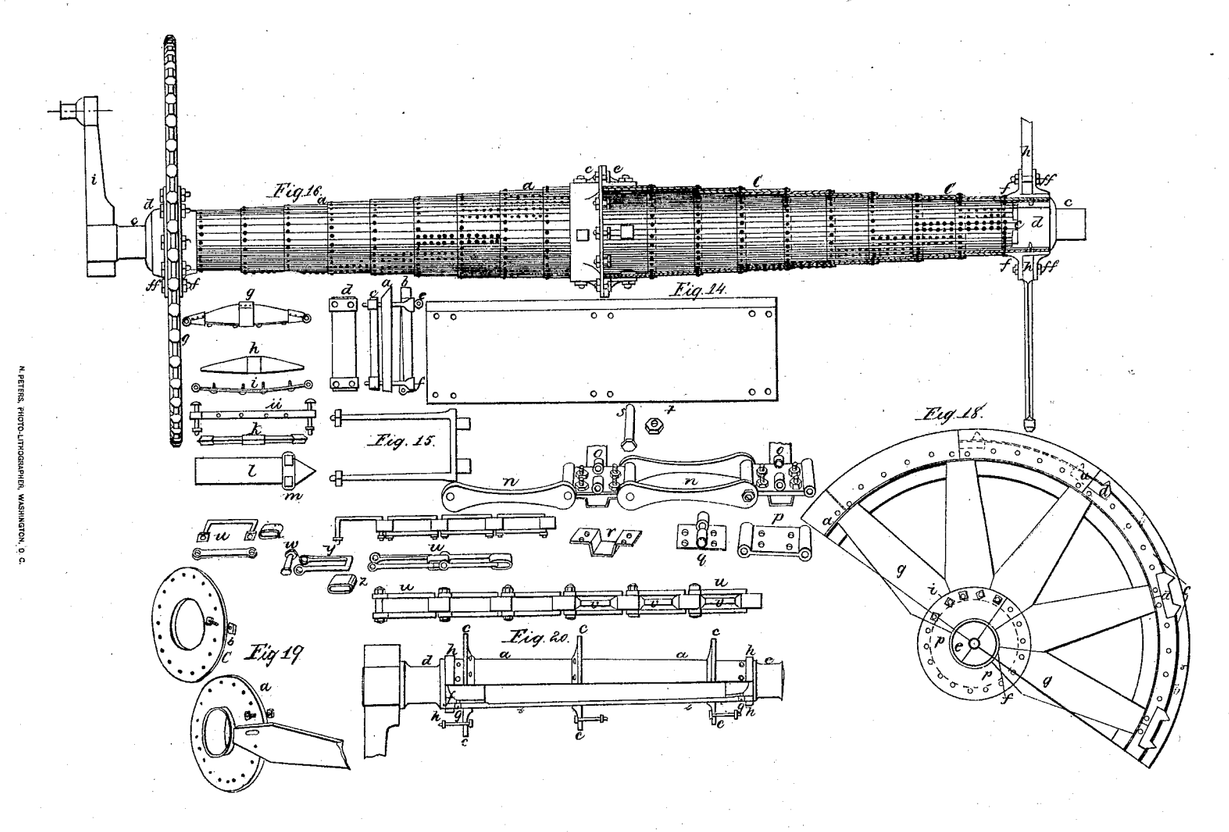
Figure 17:
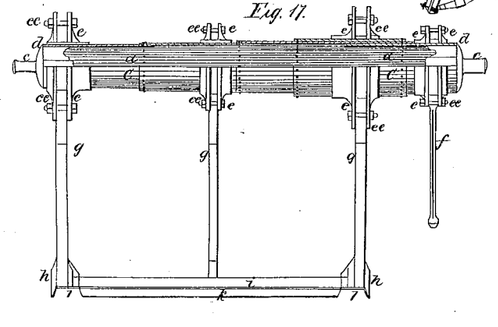

Figure I is a view of the apparatus to be seen from inside of the vessel. A is a parallelogram reservoir at the bottom of the vessel, water-proof and well secured, in which the propeller with its requisite arrangement to make it practicable is located. At the four corners B are windlasses in connection with the frame to bear the propeller, which, according to its destination, can be raised and lowered by C, the cranks. There are always two of them attached on *c c*, one shaft, and there are two of these shafts employed, one on the rear of the reservoir and the other one on the front side, which one is here to be seen. On each of both shafts on one side of the reservoir is D, a wheel attached with a groove around outside the rim close behind the cranks. These two wheels are surrounded by an endless chain running crosswise from the front to the back, outside of the reservoir. This arrangement is made to prevent unequal motion by the four windlasses if they are to be put in operation. E is a crank in connection with two bolts located inside of the reservoir. (See e, Fig. II.) At the front F is another crank. It is in connection with the sliding lid, by which the hole in the bottom of the vessel, through which the propeller from inside of the reservoir has to descend for operation, can be shut up. In connection with this crank is G, the indicator, to show the points when the hole in the bottom is opened or shut up. At the bottom front of the reservoir H is the water-proof cover of the chamber, in which the sliding lid is located when the hole for operation of the propeller is opened. I is the crank, to which the steam-engine is attached on shaft of K, the prime driving-wheel. The hollows around the rim are to suit the endless chain for proper operation in connection with L, a smaller wheel of the same shape outside of the reservoir, attached to the shaft of the driving-wheel situated inside to put the propeller in motion. By M, the frame, is no particular rule. This can always be constructed according to the convenience of the vessel, as there the engines can be put under the level of the water or on deck.

Fig. II is an interior profile view of the propeller with all parts belonging to it, in combination, lowered to the point for operation. A are the principal beams of the frame to bear the propeller. At the four corners B are the windlasses, to which the rack-pieces on the perpendicular beams are fastened. C are the cranks, always two on one shaft, on the opposite sides, fixed in a right angle; D, grooved connection-wheels, (see D, Fig. I,) and E crank and lock of the bolts, which are fixed by turning the crank to move in opposite directions. The sliding channels are fastened inside on the reservoir. The destination of these bolts is to hold the frame with the propeller to its appointed station. On the side of the four perpendicular beams F are nodes attached to support the bolts holding the frame. G is the crank by which the sliding lid of the hole in the bottom is to be put in motion. H is the principal drum, with I, conical strops, across all around, and K slanting flanges. (See Plate No. III, letter A, Figs. XI and XII.) L is the small or supporting drum. M are endless chains of particular construction, surrounding the two drums, which are so located between the frame that the surrounding chains, provided with the paddles, have to operate horizontally at the bottom of the vessel when they are in motion. (For particular description see Plate No. III.) N is a box between the two drums, fastened on the frame. It can be water-tight to lighten the propeller of weight, but it is not particularly adopted, as a rule. The destination of this box is to occasion evenness at the bottom and to prevent disadvantageous commotion of the water between the drums. O is a vaulted cover to form a canal through which the surrounding chains with the paddles can pass. The bed-grooves for it are attached inside on the frame, and the planks of which the vaulting is constructed are removable. P, the top of the reservoir, is water-proof fastened, but that it in parts can be taken off. Q, inside of the reservoir, is another lid, even with the level of the water to prevent as much as possible commotion from it. The bed for it is on the side of the reservoir. R is the motion-wheel outside of the reservoir (see L, Fig. I) on the shaft of S of the driving-wheel inside to put the principal propelling-drum in operation. Inside on front T is an endless chain operating over a wheel in connection with the crank G on front outside of the reservoir, and U another wheel below fastened by V to the head and journal of a long screw located in a chamber under X, the water-proof cover over it. Y is a nut-carrier, in combination with Z, the sliding lid to shut up the hole for the propellers by a flat $a\ a$ on the two ends, with hinges on one side attached to the nut-carrier and the other on the lid. By turning the crank G the lid will be moved to shut up or to open the hole in the bottom of the vessel. $b\ b$ on front of the lid is a plate so fitted that it serves as the door to shut up the passage of the chamber when the sliding lid is located in it. $c\ c$ are the grooves in which the lid has to move. The bed-part of them are provided with small nuts to facilitate the sliding of the lid. $e\ e$ is the crank in connection with the steam-engine. $d\ d$ are the endless chains by which the prime driving-wheel is to be put in connection with the propeller.

Fig. III is the front part of the reservoir, with the arrangement inside by which the sliding lid for the hole in the bottom is to be put in motion. A is a double case. The inclosing one is fastened on the reservoir. The inner one is fixed with B, screws, that it can be lowered and raised with a small driving-wheel located in it, of which the crank outside of the reservoir is to be seen by F, Fig. I, and G, Fig. II. C, the endless chain, combines D, the motion-wheel, on the head of the screw, by which E, the sliding lid, is to be put in motion. F is the water-tight cover of G, the chamber of the sliding lid. H are the side parts of the case over the endless chain.

Fig. IV is the interior of the plan, to be seen from above. A are the four sides of the rectangle reservoir. B is a piece of the reservoir, which is removable above the shaft I. C is the principal drum, and D the supporting-drum. F is the motion-wheel attached on the side of the drum by an endless chain, in connection with G, its driving-wheel; H, the motion-wheel on the shaft I, passing through a hole on the side of the reservoir. K and L, the beams to bear the shaft I, are bedded inside of the reservoir, but the fastening of them is so able frame bearing the propeller; k k, cross-beams to strengthen the frame. L are cross-bars to support the paddled chains at their parallel distances. M is the guard-beam of the hull; N, bed-beam of the frame in connection with the steam-engine; O, bulk-beam, (see G, Fig. VI, and P, Fig. VII;) P, cross-beam of the bulwark. (See H, Fig. VIII.)

Fig. X is a perspective view of the principal beams of the frame with the windlass attached to it, for the movable frame which carries the propeller, that it can be raised or lowered. A are beams of the movable frame outside of the vessel, and $a\ a$ are cross-beams between the two wheels to strengthen the moving frame. B are those which inside of the vessel are employed in combination with the former, and C the bulk or the inclosing frame, with $c\ c$ planks fastened on the sides to hold the moving frame in its inclosure. D, on top of the frame, is the windlass placed by which the propeller is to be raised and lowered. There are five different chains employed winding round a cylinder or running off if put in motion by a cogged wheel attached on it by means of the four cranks, these chains running through E, pulleys attached on top of the frame, and to F, iron bars, the bearers of the movable frame.

Description to Plate No. III, containing some of the principal parts of the propeller, more distinctly illustrated as on the two previous plates, where the plans in combination are represented:

Fig. XI, A is a part of the principal drum by which a vessel is to be propelled. It is on both sides closed water-tight. On the one side of it is B, its motion-wheel, attached on it, with hollows around like the driving-wheel surrounded with C, the endless chain, for the motion of the propeller. D are conical strops attached all around crossing the cylinder. (See A, Fig. XII.) Between these splints the space E is fixed for the cross-bars. (See Fig. XII.) F is the supporting-drum, of which the cylinder around is smooth. On both the drums outside G are slanting flanges to prevent the surrounding chains, to which the paddles are attached, from running off. H are long links of the chain, and I flat links, under which the spars are fastened to support the different endless chains at their parallel distances. K are the paddle-boards; L, the paddle-carrier, with a hinge on it by which it is attached to the surrounding chains; M, supporting-pieces to strengthen the paddle; N, supporting-pieces with hinges on both sides attached by O to the chain and to the paddles to hold these standing and movable that the chains can bend round the drums. P is a cramp with a hinge on it for the connection of the supporting-piece. Q is a simple cramp with nuts. By both these cramps the carrier with the paddle-board and supporting-pieces are fastened together.

Fig. XII is a part of the large propelling-drum to be seen from the rear. A are conical strops; B, the spaces on which the surrounding chains have to run; C, the spaces on which the cross-pieces attached to the chains will take hold. On both sides on the drums D are flanges; E, its motion-wheel.

Fig. XIII is a part of the chain-net which bears the propelling-paddles. A are the long links; B, flat links; C, the cross-bars to support the chains in parallel distances and to take hold between the conical strops on the large drum. (See C, Fig. XII.) They can be made out of substantial wood and bound with copper or iron, or they can be made out of iron bars. D, E, and F is a paddle-board with its supporting-pieces, and G supporting-pieces with hinges on both ends to hold the paddles standing.

Fig. XIV is a paddle-board. The edge is sharpened out slanting on one side and bound with copper to facilitate cutting of the water. It will be observed that the paddles are not flat coming out of the bottom of the vessel, but more cutting. The holes are so fitted that they suit for the fastening of the cramps.

Fig. XV is a hinge-cramp. (See O and P, Fig. XI.) A, B, and C is a paddle-board, a paddle-carrier, with hinge on one edge, and the supporting-piece, to be seen in profile how they are to be combined by E, and F the cramps. D is a supporting-piece, in front to be seen. It is bound with iron or copper, which is bent over on the sides to prevent splitting. The holes are to fit for the cramps. G is the supporting-piece. (See N, Fig. XI.) H is the wood piece, without bindings; I and $i\ i$, hinge-piece; K, the same piece from the front to be seen; L, paddle-carrier, from front to be seen, with M the hinge-cramp. N are the long links on both sides, concave between the holes, that they fit on the cylinder of the small or supporting drum. (See F, Fig. XI.) O are the flat links with hinges, under which the cross-bars are fastened, (see B, Fig. XIII;) P, the principal part of the flat link; Q, the hinge-plate; and R the cramp-plate, by which the cross-bars are fastened; S and T, bolt and nut for the joining of the chain; U, pieces of the chain, by which the different driving and motion wheels are to be put in combination; V, elevated parts outside on the rim of the wheels, between the hollows, to catch between the chain-links when in operation. By W, Y and Z single links of the chain, is to be seen that they can be prolonged and parted to any desire.

*Remarks on shafts.*—Although for the operation of these submarine propellers solid cast-iron shafts are practicable, the above-named would in many cases prefer to adopt hollow shafts of his own invention, made out of sheet-iron or cast hollow, on account of their lightness, and when the journals should be made out of steel, the operation would be very much facilitated.

Fig. XVI represents a hollow shaft, made out of sheet-iron, calculated for the operati of two propellers. The cranks on the constructed that they can be removed. This is required in case that the propeller should be raised above the water; but if the propeller only is to be raised as high that the sliding lid can move under it, so that the hole in the bottom can be shut up, it is not necessary to remove these beams. M are the four winds, of which the raked pieces are fastened on the perpendicular beams of the frame. N, the sliding grooves, are attached inside on the reservoir. On each of the two shafts, by which the windlasses are to be worked, on the one side close behind the crank O is a groove-wheel attached surrounded by an endless chain P, running crosswise over Q, a pulley, to prevent rubbing. (See Figs. I and II.) R are the cranks of S, the bolts. (See E, Figs. I and II.) T is the open hole through which the paddles of the propeller have to descend for operation. U is the sliding lid, V the nut-carrier to move on W, the screw, passing through the front of the reservoir by X, its journal, on the head of its motion-wheel. (See U, Fig. II.) Y is the flat with hinges to combine the nut-carrier with the sliding lid Z. On front of the reservoir is the crank by which the sliding lid is to be put in motion. $a\ a$ is the principal shaft, in connection with the steam-engine, by $b\ b$, the crank-pin bearing the prime driving-wheel $c\ c$.

Fig. V is a view of the interior from the front to be seen. A is the rear of the inside, and B the two sides of the reservoir, and C the perpendicular beams of the carrying-frame, with the rack-pieces of the windlasses and the sliding rods. D are the nuts to support the frame at its destined station. (See F, Fig. II.) E is the crank of the lock and bolts. (See E, Fig. II, and R S, Fig. IV.) F are the cranks of the windlasses, and G is one of the grooved connection-wheels. (See O, Fig. IV.) The beam H, resting on both sides of the reservoir, is there situated to support I, the carrying-beam of the shaft K, bearing the wheels L and M (see K and L, Fig. IV) by a surrounding chain, (see $d\ d$, Fig. 2,) in connection with the motion-wheel N, attached on the side of the principal drum. O is a part of the top of the box between the drums. (See N, Fig. II.) P is a part of the vaulting above the drums and the paddles. (See O, Fig. II.) Above the large drum Q is half of a paddle projecting from the vaulting. In front, R is the supporting-drum. S is a paddle descended outside the bottom of the vessel for operation. T is the frame of the vessel, U the middle, and V the keel.

*Description to the plan on Plate No. II.*—The plan on this plate represented is for the navigation on shallow water. The principle here is the same as the plan for sea navigation, but with this difference, the arrangement is here made that the propellers attached to a vessel are to operate on the level of the water by any draft of the vessel, and that very small engines are required for operation.

Fig. VI is a profile view of the propeller, with the principal beams of the carrying-frame from outside to be seen. A is the large propelling-wheel; B, the supporting-wheel. On both wheels outside, C are slanting flanges. D are flanges attached on the shaft, by which the spokes of the wheels are screwed together. E are the endless chains, with the paddles to them, surrounding the wheels. F are the principal beams of the inclosed frame, bearing the propelling-wheels. It can be raised and lowered according to the draft of water by the vessel. G is a beam of the bulk, with $g\ g$ planks on the side, to secure the movable frame in its inclosure. H is the hull, outside; $h\ h$, line of the bottom.

Fig. VII, profile view of the principal parts in combination, from inside of the vessel to be seen. A is the upper part of the large propelling-wheel outside of the vessel on its shaft, with B its motion-wheel for operation inside of the vessel. C is the crank-wheel, with D, the pin to which the engine is attached on shaft of E, the prime driving-wheel, and F the fly-wheel. The endless chain G combines the driving-wheels for operation. H is a part of the paddle-chain surrounding the wheels outside of the vessel. I are the principal beams of the movable frame, (see F, Fig. VI, and K beams of the inclosing frame, (see G, Fig. VI;) $k\ k$, planks to hold the movable frame in its inclosure. L is the bottom of a deepened chamber inside the hull, in which the motion-wheel on the shaft of the large propelling-wheel has to descend when the propeller is to be lowered; M, guard-beam; N, hold; $n\ n$, bottom of the vessel. The dots show the position of the propelling-wheels outside of the vessel. O are the iron bars bearing the movable frame, to which the pulleys of the windlass are attached. P is the guard-beam of the bulwark.

Fig. VIII is a view where the combination of the propeller from the rear is to be seen. A is the wheel with the slanting flanges outside; B, cross-bars with the conical strops attached on them to support the paddled chains, with C these cross-bars. D is a paddle below, and $d\ d$ one above the wheel; E, the motion-wheel on shaft F of the large propelling-wheel. (See B, Fig. VII.) $ff$ is the shaft of the supporting-wheel. G are beams of the movable frame. (See F, Fig. VI, and I, Fig. VII.) H are beams of the inclosing frame. I is the bottom of the chamber for the motion-wheel; K, the hull; L, the bottom, and M the hold of the vessel.

Fig. IX is the plan to be seen from above. A is the large propelling-wheel; B, the supporting-wheel; $b\ b$ its shaft; C, cross-bars to hold the rims of the wheels in standing parallel, front of the supporting-wheel and rear of the large wheel. D are paddles; E, motion-wheel on shaft F by an endless chain in connection with G, the prime driving-wheel; H, the fly-wheel, and I the crank on the same shaft. K are the principal beams of the movedges are fixed that they stand right in angle at their opposite sides. It is calculated here that the journals are to be made out of steel, as then the diameter can be diminished about one-third part—that is to say, a journal of steel, by a diameter of eight inches, can overcome a resistance whereby a cast-iron journal a diameter of twelve inches would be required; but it is not an adopted rule by these hollow shafts that the journals are to be made of steel. They can, on account of economy, be cast also, as well by hollow cast shafts as by those made of sheet-iron. Where cast journals are to be adopted, the core to fill up the vacuum of the hollow tube is then to be cast in one piece with the journal. A is half of a shaft to be seen when finished. By B, the other half, the inside is to be seen, and it will be observed that the sheet-iron plates throughout are doubled and that each of them is rounded to form a cylinder for itself. The edges do not lap over where they join. The cylinders are made so that one always fits over the other, and therefore each of these cylinders has another diameter, and the one always is shoved inside of the other so far that where they are riveted at the rounding the rivets have to pass through three thicknesses of the sheet-iron plates. On both ends C are the journals. D, the core, is cast over the steel piece to form the journal that it fits in the hollow of the shaft. E are cast-iron flanges, by which the two parts of the shaft are to be joined when for convenience it is made out of two pieces; but the shaft can be made in one piece also. F are flanges, and $f\ f$ the plates by which the wheels are to be fastened to the shaft. G is one of the driving-wheels. By H is to be seen how the wheels are fastened, and I is a crank on one side of the shaft.

Fig. XVII is a shaft for a propelling-wheel for shallow water. It is to be made on the same plan as that of Fig. XVI; but as these shafts have not to overcome so much resistance they can be made out of single sheet-iron. By A is the inside of the upper part of the shaft to be seen, by B below the outside. C are the pins, made of wrought-iron, with D, the core, cast on them to fill up the vacuum between the hollow tube and the pins; E, flanges, and $e\ e$ the plates by which the wheels are to be fastened. F is a spoke of the motion-wheel; G, spokes of the propelling-wheel; H, the rims; I, cross-bar, with K, conical strops, on it, (see D, Fig. XVIII.)

Fig. XVIII is a part of a propelling-wheel for shallow water. A is a quarter of the rim from outside to be seen. By the other quarter B is the slanting flange to be seen. From between the rims of the wheel C is an iron hoop around the wheel, on which the paddle-chains have to operate. D are the spars with the conical strops, (see I, Fig. XVII;) E, quarter of the hollow shaft; F, the core to fill up the vacuum; H, flanges, with I the plates by which the spokes of the wheels are to be fastened.

Fig. XIX, flange, and B the plate by which the wheels are to be attached on the shaft.

Fig. XX represents a hollow cast-iron shaft. The journals or pins are combined to them by the same rule as by the sheet-iron shafts; but the flanges for the fastening of the wheels can be cast in one piece on the hollow tube. By A is half of the shaft outside, and by B the other half, the hollow inside to be seen. C are the flanges for the fastening of the wheels; D, the journal, and E the pin, with F, these parts cast in one piece on them, to fit inside of the tube. They are deep concaved. There are G, bolts, employed to hold them together, and by H they are bound by strong wrought-iron hoops.

Having thus fully described my improvements in horizontal operating or endless-chain propellers, I do not mean to claim the invention of the endless-chain propeller or the application of the endless chains to communicate power from one wheel to another; but

What I do claim as new, and which I desire to secure by Letters Patent, is—

1. Suspending the endless-chain propeller, which is to be put in motion by an endless chain running on the side wheel on the principal drum under water in a rigid frame inside of the water-tight chamber, the frame being capable of an upward and downward motion parallel to itself by means of the four racks and pinions or their equivalents acted upon by gearing connected each to each, said frame being connected with an indicator, by which the situation of the propeller may be ascertained, the whole constructed substan- in the manner and for the purposes herein described.

2. The sliding lid to the aperture in the bottom of the vessel, through which the propeller projects when lowered for operation, but when the propeller is raised inside of the vessel the lid closes the aperture, so that the speed of the vessel may not be impeded when under sail alone by the action of the water on the aperture in the bottom, said sliding lid being worked by a screw or its equivalent in connection with an indicator, by which the position of the lid can be seen, substantially as herein described.

CHARLES F. FISHER.

Witnesses:
CHAS. C. BENENGER,
R. E. SIMMS.